(12) United States Patent
Anflo et al.

(10) Patent No.: US 7,211,233 B2
(45) Date of Patent: *May 1, 2007

(54) METHOD OF PREPARING GRANULES

(75) Inventors: Kjell Anflo, Haninge (SE); Jesper Brandt, Falsterbo (SE); Ola Lyckfeldt, Göteborg (SE)

(73) Assignee: Svenska Rymdaktiebolaget, Solna (SE)

( * ) Notice: Subject to any disclaimer, the term of this patent is extended or adjusted under 35 U.S.C. 154(b) by 269 days.

This patent is subject to a terminal disclaimer.

(21) Appl. No.: 10/478,408

(22) PCT Filed: May 23, 2002

(86) PCT No.: PCT/SE02/00989

§ 371 (c)(1),
(2), (4) Date: Jun. 7, 2004

(87) PCT Pub. No.: WO02/094429

PCT Pub. Date: Nov. 28, 2002

(65) Prior Publication Data

US 2004/0208811 A1 Oct. 21, 2004

(30) Foreign Application Priority Data

May 23, 2001 (SE) .................................... 0101852

(51) Int. Cl.
*B29B 9/00* (2006.01)
*C04B 35/00* (2006.01)

(52) U.S. Cl. ...................... 423/263; 423/600; 423/625; 264/5; 264/13; 264/14; 501/80; 501/83; 501/127; 501/152; 501/153; 502/8

(58) Field of Classification Search .................... 264/5, 264/13, 14; 501/80, 83, 127, 152, 153; 423/625, 423/600, 263; 502/8
See application file for complete search history.

(56) References Cited

U.S. PATENT DOCUMENTS

| 2,872,719 | A | * | 2/1959 | Brassfield et al. ........... 264/0.5 |
| 3,888,787 | A | | 6/1975 | Hein et al. |
| 4,707,459 | A | | 11/1987 | Kennedy et al. |
| 5,466,400 | A | * | 11/1995 | Pujari et al. .................. 264/13 |
| 6,284,694 | B1 | | 9/2001 | Moeltgen et al. |

FOREIGN PATENT DOCUMENTS

| FR | 2 814 480 | | 3/2002 |
| GB | 1 344 869 | | 1/1974 |
| JP | 57-84731 A | * | 5/1982 |
| JP | 62-262734 A | * | 11/1987 |
| JP | 63-229137 A | * | 9/1988 |

* cited by examiner

*Primary Examiner*—Timothy C. Vanoy
(74) *Attorney, Agent, or Firm*—Browdy and Neimark, PLLC

(57) ABSTRACT

A method of preparing spherical pellets from a slurry comprising a ceramic powder, a solvent, and any desired additives, by means of a drop-generating orifice to which said slurry is fed is described, wherein the drops are released from said orifice by means of a relative flow of a liquid medium which is a poor solvent for the solvent of the slurry, formed into spherical bodies in said liquid medium by means of the action of surface tension, and thereafter treated for consolidation. More specifically, the present invention relates to the preparation of pellets of a catalyst or catalyst support material, suitable for use in high temperature conditions.

20 Claims, 1 Drawing Sheet

METHOD OF PREPARING GRANULES

Figure 1:
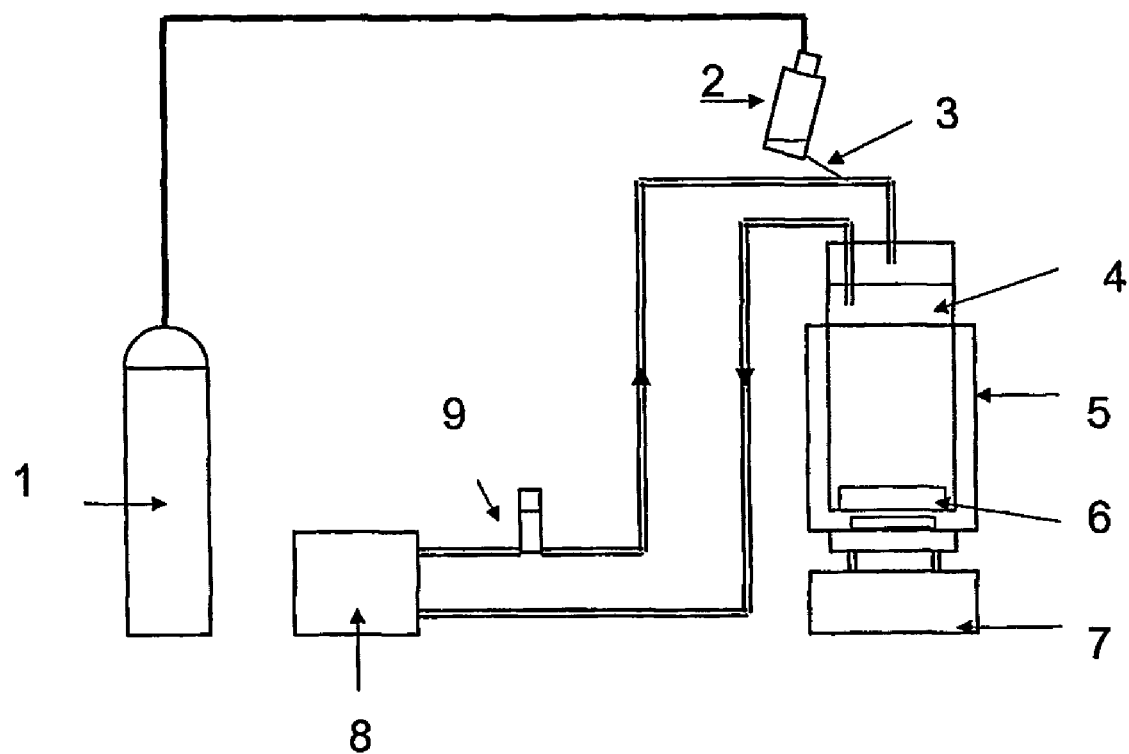

The present invention relates to a method of preparing spherical pellets of a controllable, uniform size from a slurry comprising a ceramic powder, a solvent, and any suitable additives. The method is based on the formation of drops by means of a drop-generating orifice to which said slurry is fed, the drops are thereafter released from the drop-generating orifice by means of a relative flow of a liquid medium, formed into spherical bodies in said liquid medium by the action of surface tension, and thereafter treated for consolidation by a suitable direct casting method.

BACKGROUND ART

Pellets of ceramic materials are desired in many applications. Depending on the ceramic constituents, the pellets can exhibit different properties. For example, a suitable ceramic material having catalytic properties could be selected and formed into pellets having catalytic properties, or a ceramic carrier material could be selected for the preparation of pellets of catalyst carrier material. There are a number of conventional methods that can be used for preparing ceramic pellets, such as different moulding methods, optionally in combination with conventional powder processing methods used for manufacture of ceramic or metallic components.

The forming of spherical pellets requires sophisticated moulds in order for the pellets to be spherical and exhibit a smooth surface. The mould will for example generally have a exhibit a certain draft angle, which will cause imperfection in the surface of the pellet. Demoulding of the pellet will rarely be perfect and fractions of the moulded material are prone to stick to the mould, which will then be separated from the pellet during demoulding. These problems generally become more pronounced as the desired diameter of the pellet to be moulded decreases. JP8059352 describes a method for granulating a ceramic material with no need for a large-scale equipment and without causing contamination, which also improves the degree of freedom in the production process. According to the method a slurry containing ceramic raw material is dropped on a smooth surface having a high water repellent property, and the dropped material can thereafter be rolled on the surface into a spherical shape. The drops are formed by the action of surface tension.

It is an object of the present invention to provide a simplified method of forming smaller sized, spherical pellets of a controllable, uniform size from a ceramic slurry.

For the general method according to which spherical pellets are prepared from a slurry comprising a ceramic powder, a solvent, and any desired additives by means of a drop-generating orifice to which said slurry is fed, this object has been achieved by which drops are released from the drop-generating orifice by means of a relative flow of a liquid medium in relation to the orifice, formed into spherical bodies in said liquid medium by the action of surface tension, and thereafter treated for consolidation.

SUMMARY OF INVENTION

By means of the method of the invention spherical pellets of 0.2–5 mm can be prepared, without the use of any conventional mould.

By means of the present method, the diameter of the pellets can be closely controlled by regulating the relative flow rate of the liquid medium, and the feed pressure of the slurry. This is a significant improvement over the method of JP8059352.

The method is very versatile, and can be used with any slurry formed of any presently known powder mixture, used in the field of ceramic powder processing or powder metallurgy, which slurry according to the present invention also may contain a consolidating agent.

As examples of desired additives which can be used in the slurry, the following can be mentioned: dispersants, defoamers, binders, fillers, consolidating agents, pH stabilisers, and other processing aids etc.

When a particulate organic filler, such as in the form of fibres or particles, and/or a particulate consolidating agent is used in the slurry, the pellets prepared according to the present method will generally exhibit some residual porosity from the burn-out of the filler and/or consolidating agent used.

It is also conceivable to use a fibrous or particulate filler, optionally in addition to a consolidating agent, which filler can be removed by means of burn-out, in order to create pores, corresponding to the geometrical shape of the filler after burn-out thereof.

Accordingly, if desired, the amount of consolidating agent can be increased above the amount necessary for consolidation, in order to obtain open porosity in the pellets after burn-out of the consolidating agent. A filler which can be burned-out can also be used for the same purpose. The size of the pores can then be regulated by means of the particle size of the consolidating agent and/or filler.

In a preferred embodiment of the inventive method, starch is used as consolidating agent.

According to one embodiment of the method, a catalytic material can be used as the ceramic material in order to obtain spherical catalytically active pellets.

According to a further embodiment, a ceramic material, having a high sintering resistance, and/or containing a sintering inhibiting agent can be used, in order to obtain porous pellets which maintain, or only slowly degrade in their desired area at a high temperature. The pellets thus formed will also maintain their geometry when subjected to high temperatures, also when exposed to relevant fluids, under such temperatures.

Suitable compositions and ceramic materials which can be used in the method of the present invention are, for example, those described in EP-A-0927709 and U.S. Pat. No. 6,169,048, and the like.

BRIEF DESCRIPTION OF THE ATTACHED DRAWINGS

FIG. 1 illustrates a principal set-up for the forming of spherical pellets according to the method of the present invention, which set-up was used in the Examples.

DETAILED DESCRIPTION OF THE INVENTION

The method of the present invention is based on forming drops of a slurry in a relative flow of liquid medium. The slurry is fed through a small opening, such as the opening of a cannula, which opening enters into liquid medium. The force of the relative flow will cause a certain amount of slurry to separate from the opening, and be entailed by the flow.

In order to establish the action of surface tension, which is believed to be the principal driving force underlying the forcing of the released drops to assume a spherical shape, a liquid medium which is a poor solvent for the solvent of the slurry is preferably selected. This desired effect will be enhanced by selecting a medium which is immiscible with the solvent of the slurry, and is believed to be further enhanced by a large difference in the surface energies of the different media. In any case, the liquid medium should be effective to force the released drops to minimise their surface area.

According to the present invention, a relative flow of a liquid medium means that slurry enters into a flow of liquid medium, or into a stationary liquid medium, in which case the opening described a movement relative to the liquid medium is moved back and forth, or in a circle, for example, relative to the stationary medium.

The direction of the relative flow of the liquid medium is not critical and can vary from being coincidental with direction of formation of the drops, to essentially perpendicular to the direction of formation of the drops, the former of which is presently being preferred The spherical drops thus formed are then treated for consolidation, in accordance with the specific consolidation method used, drying, optionally burn-out of any filler and/or consolidating agent used, and sintering.

By performing the sintering step under pressure-less conditions, i.e. without the use of a mould, the pellets will exhibit a macro-porosity depending on the specific consolidating agent and/or filler used, and more particularly the particle size and shape thereof.

By means of the present method, spherical pellets of from 0.2–5 mm can be obtained. For a given slurry and given diameter of the opening, the size of the pellets can be closely controlled by regulating the relative flow rate of the liquid medium, and the feed pressure of the slurry. Other factors that will affect the pellet sizes obtainable are primarily the viscosity of the slurry, the density of the slurry, the diameter of the opening, and the difference between the surface energies of the drop and the liquid media.

Any suitable consolidating agent can be used in the present method. The consolidating agent will of course be dependent on the desired method of consolidation. Suitable consolidating agents and consolidation methods, respectively, are;

starch—starch consolidation,
protein—protein coagulation,
polymer—gel casting (from monomers, or polymers which are cross-linked, and
solvent of the slurry—freezing.

The term direct casting as used in the present application is generally defined as a process of transforming a (powder) suspension into a rigid body without liquid removal or powder compaction, and is intended to embrace such methods wherein a consolidating agent is used, also referred to as direct consolidation methods(in the field of powder processing technologies). The terms direct casting and consolidation will be used interchangeably in the application.

Suitably examples of direct casting method are described by Wolfgang M. Sigmund et al in "Novel Powder-Processing Methods for Advanced Ceramics", *J Am Ceram Soc,* 83 [7]1557–74 (2000), which is incorporated by reference herein in its entirety For the purpose of regulating the size of the pores resulting from burn-out in the pellets, starch is very suitable, and can also perform the function of a consolidating agent. The average size of the starch particles generally ranges from 2–100 μm depending on from which plant the starch is derived.

Thus, for example, the consolidating amount of starch could be of one size, and additional starch particles added in order to obtain an open porosity could be of another size. It is also conceivable that suitable starch addition will reduce the density of the obtained pellets without accomplishing an open continuous porous structure The design of the apparatus used to form the drops or droplets is not critical, and can be of any design as long as drops can be produced.

With reference to FIG. 1, an example of a suitable set-up of the apparatus for the forming of spherical pellets is illustrated, wherein 2 is a container with water-based slurry, 1 is a vessel containing pressurised gas for pressurising the slurry container, 3 is a cannula, 4 is a glass beaker containing organic liquid medium, 5 is a container with medium for regulating the temperature of the organic liquid, 6 is a sieve for collecting the pellets, 7 represents a magnet stirrer and heater, 8 is a peristaltic pump, and 9 is a flow equaliser.

It is preferred that the drops formed be subjected to heat as soon as possible after formation in order to consolidate the drops. This can be done by discharging the drops from the apparatus directly into a suitable medium for consolidation. In for example the case of polymers, starch and protein requiring heating for consolidation, the medium, such as a liquid, is heated to consolidation temperature. Other means of heating the drops are of course also possible, such as a heated gas medium or microwave radiation. In order to obtain spherical droplets, the droplets must have enough time to become spherical, by the force of surface tension, before the solidification temperature is reached in the droplets, as this will lock the current geometry.

In the case of consolidation by means of freezing of the solvent of the slurry, a cold medium is used.

In the method of the invention, apparatus according to the following can be used, for example. A suitable apparatus in its most simple embodiment can be based on the following general components. An opening, such as the opening of a cannula, at which drops are released or ejected, to which cannula a slurry to be consolidated is provided. The drops are then forced to separate from the opening by means of the flow of a liquid medium acting on the ejected slurry. A suitable flow can for example be achieved by means of a cannula displaced in a tube, in which tube the liquid medium flows.

After consolidation, the pellets are preferably dried before any burn-out of consolidating agent and/or filler, in order to prevent disintegration of the pellets during the burn-out, due to rapid build up of any vapour inside the bodies.

As will be shown in the examples, the inventive method can for example be used for preparing spherical pellets, of a carefully regulated diameter, of a catalytic carrier material, to which pellets a catalytic metal subsequently can be applied by any conventional methods. The ceramic material per se may of course also be catalytically active, in which case the pellets can be used as obtained.

When the pellets are to be used for catalytic purposes, it is often desirable that the pellets exhibit an as great as possible specific surface area, in order to maximise the catalytic surface area accessible to the reaction to be catalysed. In this case it is of a great advantage to use a ceramic material having high resistance to sintering at high temperatures. Preferably, such powder has a narrow particle size distribution. Thereby, pellets having a fine (sub-micron range) porosity can be obtained, such as for example in the range of 100–200 nm. By using a higher amount of consolidating agentin the slurry than necessary for consolidation, an open macro-porous structure can be obtained, formed by the pores resulting from burned-out particles of consolidating agent and/or filler in the pellets. Thereby, an increased fraction of the nano-porous structure will be available to catalysis, and thus the pellets will exhibit a substantially increased effective catalytic surface area.

A suitable interval the macro-pores are from 1–500 μm, depending on size of the pellet.

Such an open porosity will also reduce the flow resistance posed by the pellets, when contained in a catalytic bed for example. Also, the risk for vapour induced disintegration of the pellets could be reduced, since any vapour formed in the pores by liquid that has penetrated into the pellet more easily can escape from the structure by means of an open porosity.

By means of varying the amount of consolidating agent (or filler which can be burned-out), and thereby the extent of the open porosity, pellets can be prepared offering a controlled pressure resistance, when contained in a catalyst bed for example.

According to a preferred embodiment of the method of the present invention, drops are formed from a slurry containing ceramic powder, starch as the consolidating agent, optionally a dispersant, and water, which drops thereafter are heated for swelling of the starch, such as, for example, by being heated in a liquid medium. The slurry can also contain other organic constituents and solvents or dispersing media or liquids, as long as an amount of water sufficient for effecting swelling is present. Naturally, a liquid medium for the forming of spheres must be selected that does not disturb the function of the constituents of the slurry.

During heating to elevated temperatures, the starch granules will absorb water from the slurry and swell, thereby forming rigid bodies, which can be collected and dried. During the swelling, the consolidated bodies are preferably allowed to consolidate (solidify) freely, i.e. without the use of a mould. The dried bodies are thereafter heated at higher temperatures in order to remove the starch through a burn-out, and finally sintered at even higher temperatures to achieve a material with sufficient strength and hardness. The macro-porosity remaining in the material after sintering will generally correspond to the amount and type of starch pellets used in the slurry, and the ability of the ceramic matrix to density.

The shape, size and swelling temperature of the starch granules depends on the specific starch type. Among the most common starches for commercial uses, potato starch swell at 50–55° C., corn and rice starch at 60–75° C. Examples of other varieties of starch which can be used in the invention are those obtained from the seeds of cereal grains, such as sorghum and wheat, also from certain roots, such as tapioca, cassava and arrowroot, and from the pitch of the sago palm. The mean granule size is 55 μm for potato starch, 10–15 μm for corn starch and 5 μm for rice starch. The size of the starch used is not critical and can be selected based on the specific purpose and the desired size of the pores. The starch can be in native form or in chemical modified form. For example, the starch can be modified by etherification to make it more stable towards mechanical treatment and acidic conditions.

In a bed of catalytic material used in for example a rocket engine, the flow a fluid through such bed must not be overly inhibited, while still offering a certain flow resistance. That is, the flow resistance offered by such catalytic bed must be regulated within certain limits. Further, the material must also exhibit a high specific surface area, which should be maintained during use the under harsh conditions encountered in a rocket engine.

In the following, the present invention will primarily be described with reference to aluminium oxide powder, and to a lanthanum hexaaluminate powder exhibiting a high sintering resistance. Naturally, the inventive general forming technique can also be used with other suitable powders resistant to burn-out (removal) of consolidating agent and any organic filler.

The present invention will now be described in more detail with reference to the following examples.

EXAMPLE 1

Preparation of spheres from a slurry containing an amount of starch effective for consolidation of the drops.

The constituents used are listed below:

| Constituent | Designation/Manufacturer | Percentage |
|---|---|---|
| Aluminium oxide powder | AKP30/Sumitomo, Japan | 35 vol % (solids content) |
| Dispersant | Duramax D-3021/Rohm and Haas France S.A., France | 1.0% by weight based on powder |
| Liquid | Distilled water | Balance |
| Starch | Mikrolys 54, 1.43 g/cm$^3$/Lyckeby Stärkelse AB, Sweden | 5% by vol. based on powder |

The ceramic powder used in the example was aluminium oxide. The oxide was first dispersed in water together with the dispersant by ball milling. Then the starch was added during mixing by means of a propeller. In this case a chemical modified and size-fractionated potato starch with a mean pellet size of 20 μm was used. Thereafter the slurry obtained was forced into a cannula with an inner diameter of 0.3 mm, which was inserted into a polyethylene tube with an inner diameter of 3.5. The liquid heating medium was circulating in the polyethylene tube and the flow forced the drops to be released (at a premature stage) from the opening of the cannula. By changing merely the flow velocity of the liquid heating medium, the size of the drops could readily be varied between 0.5 and 1.5 mm. The liquid heating medium used, in which the spheres are consolidated, was liquid paraffin (KeboLab, item No. 13647-5), and was kept at an elevated temperature of 60–70° C.

The consolidated pellets were collected and dried in air at about 50° C. Thereafter the spheres were burned out at 500° C. and sintered at 1600° C., for 30 minutes in air. The heating ramps used were 1° C./min up to 500° C. and 5° C./min up to the sintering temperature.

EXAMPLE 2

Preparation of spheres from a slurry containing an amount of starch effective for consolidation of the drops.

The constituents used in the example are listed below:

| Constituent | Designation/Manufacturer | Percentage |
|---|---|---|
| Hexaaluminate powder | LaAl$_{11}$O$_{18}$, from emulsion/Kemisk Teknologi, KTH, Sweden | 30 vol % (solids content) |
| Dispersant | Duramax D-3021/Rohm and Haas France S.A., France | 1.0% by weight based on powder |
| Liquid | Destillerat vatten | Balance |
| Starch | Mikrolys 54, 1.43 g/cm$^3$/Lyckeby Stärkelse AB, Sweden | 5% by vol. based on powder |

The ceramic powder used in the example was lanthanum-hexaaluminate.

The powder was amorphous and had a very fine particle size and exhibited a specific surface area of 280 m$^2$/g. However, using such a fine powder, slurries of sufficiently high solids content are difficult to reach. Therefore, the powder was additionally calcinated at 1200° C. during 4 hours in air. At this temperature the powder is transformed into a crystalline phase and the specific surface area is reduced to 30–35 m²/g.

A slurry was prepared based on the constituents enumerated above. Thereafter the slurry obtained was forced into a cannula with an inner diameter of 0.3 mm, which was inserted into a polyethylene tube with an inner diameter of 3.5 mm. The liquid heating medium was circulating in the polyethylene tube and the flow forced the drops to be released (at a premature stage) from the opening of the cannula. By merely changing the flow velocity of the liquid heating medium, the size of the drops could readily be varied between 0.5 and 1.5 mm. The liquid heating medium used, in which the spheres are consolidated, was liquid paraffin (KeboLab, item No. 13647-5), and was kept at an elevated temperature of 60–70° C.

The consolidated pellets were collected and dried in air at about 50° C. Thereafter the spheres were sintered at 1200, 1300 and 1400° C., respectively, for 30 minutes in air. The heating ramps used were 1° C./min up to 500° C. and 5° C./min up to the sintering temperatures.

The pellets obtained after sintering were spherical, and exhibited a very smooth surface, and a high side crush strength. The porosity was found to be binomial, with the larger pores resulting from the consolidating agent particles, and the finer porous structure, 100–200 nm, resulting from the specific ceramic powder used. The pellets were found to be resistant up to a temperature of at least 1700° C.

The invention claimed is:

1. Method of preparing spherical pellets from a slurry comprising a ceramic powder, a solvent, and optionally one or more additives, from a drop-generating orifice to which said slurry is fed, characterised in that
   the drop-generating orifice extends into a liquid medium;
   the drops are released from said orifice into the liquid medium by a relative flow of the liquid medium in relation to the orifice, and
   the drops are formed into spherical bodies in said liquid medium by the action of surface tension, and
   thereafter treated for consolidation.

2. The method of claim 1, wherein spherical pellets of a diameter of from 0.2 to 5 mm are formed.

3. Method of claim 2, wherein the slurry contains a consolidating agent and/or filler.

4. Method of claim 3, wherein the ceramic powder is a hexaaluminate, and the consolidating agent is in the form of particles of a selected particle size and is used in an amount effective for obtaining an open porosity in the pellets after burn-out thereof, corresponding to said selected particle size.

5. Method of claim 2, wherein the slurry contains a consolidating agent and/or a filler in the particle size interval 1–500 μm.

6. The method of claim 5, wherein starch is used as consolidating agent and/or filler.

7. Method of claim 2, wherein the spherical bodies are treated for consolidation by either cooling, heating or destabilisation.

8. The method of claim 7, wherein the ceramic powder used exhibits a high sintering resistance and/or a sintering inhibiting agent is used.

9. The method of claim 8, wherein the ceramic powder is a hexaaluminate.

10. The method of claim 9, wherein the hexaaluminate is $LaAl_{11}O_{18}$.

11. Method of claim 1, wherein the slurry contains a consolidating agent and/or a filler in the particle size interval 1–500 μm.

12. Method of claim 1, wherein the spherical bodies are treated for consolidation by either cooling, heating or destabilisation.

13. The method of claim 12, wherein the ceramic powder used exhibits a high sintering resistance and/or a sintering inhibiting agent is used.

14. The method of claim 13, wherein the ceramic powder is a hexaaluminate.

15. The method of claim 14, wherein the hexaaluminate is $LaAl_{11}O_{18}$.

16. Method of preparing spherical pellets from a slurry comprising a ceramic powder, a solvent, and optionally one or more additives, from a drop-generating orifice to which said slurry is fed, characterised in that
   the drops are released from said orifice into a liquid medium by a relative flow of the liquid medium in relation to the orifice, and
   the drops are formed into spherical bodies in said liquid medium by the action of surface tension, and
   thereafter treated for consolidation,
   wherein the slurry contains a consolidating agent and/or filler.

17. Method of claim 16, wherein spherical pellets of a diameter of 0.2 to 5 mm are formed, and the consolidating agent is in the form of particles of a selected particle size and is used in an amount effective for obtaining an open porosity in the pellets after burn-out thereof, corresponding to said selected particle size.

18. The method of claim 17, wherein starch is used as consolidating agent and/or filler.

19. The method of claim 16, wherein starch is used as consolidating agent and/or filler.

20. A method of preparing spherical pellets from a slurry comprising a ceramic powder, a solvent, and optionally one or more additives, from a drop-generating orifice to which said slurry is fed, characterised in that
   the drops are released from said orifice into a liquid medium by a relative flow of the liquid medium in relation to the orifice, and
   the drops are formed into spherical bodies in said liquid medium by the action of surface tension, and
   thereafter treated for consolidation,
   wherein said one or more optional additives is or are present in the slurry, and are selected from the group consisting of one or more of dispersants, defoamers, binders, fillers, consolidating agents and pH stabilizers.

* * * * *